US012136189B2

(12) United States Patent
Kumar et al.

(10) Patent No.: US 12,136,189 B2
(45) Date of Patent: Nov. 5, 2024

(54) MEDIA ENHANCEMENT USING DISCRIMINATIVE AND GENERATIVE MODELS WITH FEEDBACK

(71) Applicant: ADOBE INC., San Jose, CA (US)

(72) Inventors: Akhilesh Kumar, San Jose, CA (US); Zhe Lin, Bellevue, WA (US); Baldo Faieta, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 401 days.

(21) Appl. No.: 17/172,744

(22) Filed: Feb. 10, 2021

(65) Prior Publication Data
US 2022/0253990 A1 Aug. 11, 2022

(51) Int. Cl.
G06T 7/00 (2017.01)
G06F 18/214 (2023.01)
G06F 18/2411 (2023.01)
G06N 3/04 (2023.01)
G06T 5/20 (2006.01)

(52) U.S. Cl.
CPC .............. *G06T 5/20* (2013.01); *G06F 18/214* (2023.01); *G06F 18/2411* (2023.01); *G06N 3/04* (2013.01); *G06T 7/0002* (2013.01)

(58) Field of Classification Search
None
See application file for complete search history.

(56) References Cited

U.S. PATENT DOCUMENTS

| | | | | |
|---|---|---|---|---|
| 11,030,726 B1 * | 6/2021 | Minor | ..................... | G06V 20/00 |
| 11,366,983 B2 * | 6/2022 | Park | ...................... | G06F 18/214 |
| 11,514,948 B1 * | 11/2022 | Nair | ..................... | G11B 27/036 |
| 11,561,326 B1 * | 1/2023 | Green | .................. | G06N 3/0475 |
| 11,616,988 B2 * | 3/2023 | Dinh | ....................... | G06N 3/02 375/240.26 |

(Continued)

OTHER PUBLICATIONS

Nicolae, "PLU: The Piecewise Linear Unit Activation Function", arXiv:1809.09534v1 [cs.NE] Sep. 3, 2018. (Year: 2018).*

(Continued)

*Primary Examiner* — Randolph I Chu
(74) *Attorney, Agent, or Firm* — F. CHAU & ASSOCIATES, LLC

(57) ABSTRACT

The present disclosure describes systems and methods for image enhancement. Embodiments of the present disclosure provide an image enhancement system with a feedback mechanism that provides quantifiable image enhancement information. An image enhancement system may include a discriminator network that determines the quality of the media object. In cases where the discriminator network determines that the media object has a low image quality score (e.g., an image quality score below a quality threshold), the image enhancement system may perform enhancement on the media object using an enhancement network (e.g., using an enhancement network that includes a generative neural network or a generative adversarial network (GAN) model). The discriminator network may then generate an enhancement score for the enhanced media object that may be provided to the user as a feedback mechanism (e.g., where the enhancement score generated by the discriminator network quantifies the enhancement performed by the enhancement network).

19 Claims, 8 Drawing Sheets

(56) References Cited

U.S. PATENT DOCUMENTS

| | | | |
|---|---|---|---|
| 11,775,805 B2* | 10/2023 | Pillai | G06F 7/556 |
| | | | 706/25 |
| 11,776,091 B1* | 10/2023 | Molholm | G06T 5/50 |
| | | | 382/157 |
| 2015/0071363 A1* | 3/2015 | Sun | H04N 19/154 |
| | | | 375/240.27 |
| 2019/0246477 A1* | 8/2019 | Sinitsyn | G08B 13/194 |
| 2020/0027251 A1* | 1/2020 | Demesmaeker | G06T 11/006 |
| 2020/0257985 A1* | 8/2020 | West | G06N 3/045 |
| 2020/0293783 A1* | 9/2020 | Ramaswamy | H04N 21/23418 |
| 2020/0364545 A1* | 11/2020 | Shattil | G06N 3/08 |
| 2020/0408864 A1* | 12/2020 | Mailhe | G06N 3/088 |
| 2021/0385374 A1* | 12/2021 | Giordano | H04N 23/6811 |
| 2022/0207728 A1* | 6/2022 | Rittscher | G06T 7/0012 |
| 2022/0245792 A1* | 8/2022 | Gao | G06T 7/0008 |
| 2022/0253990 A1* | 8/2022 | Kumar | G06V 10/82 |
| 2023/0289611 A1* | 9/2023 | Baker | G06N 3/088 |
| | | | 706/15 |

OTHER PUBLICATIONS

Chen, et al., "Deep Photo Enhancer: Unpaired Learning for Image Enhancement from Photographs with GANs", Computer Vision Foundation, 2018, pp. 6306-6314.

* cited by examiner

Enhancement Score = 0.98
Status: Rejected

Enhancement Score = 0.22
Status: Accepted

MEDIA ENHANCEMENT USING DISCRIMINATIVE AND GENERATIVE MODELS WITH FEEDBACK

BACKGROUND

The following relates generally to image enhancement, and more specifically to image and video enhancement using discriminative and generative neural network models.

Image enhancement is a process used to increase the quality of an image or video. As an example, in cases where a camera moves slightly during photo capture, rendering the resulting image blurry, image enhancement can provide a solution where the photo is improved enough to provide a useable image.

Manual image enhancement provides the ability for a user to choose a feature, such as brightness or exposure, and globally modify the feature. Additionally or alternatively, some image editing software enhances an image automatically. In some cases, manual image enhancement and image editing software may enhance images in a manner that is visible to a user (e.g., such as by displaying both of, or toggling between, an original image and an enhanced version of the image).

However, such methods do not provide a feedback mechanism such that users can see the visual changes in the image (or video) in addition to any quantification of the image enhancement. Therefore, there is a need in the art for systems to provide a visualization of the amount of image enhancement performed on an image (or video) as well as provide a quantifiable amount of the enhancement. Accordingly, image enhancement feedback mechanisms that provide quantifiable image enhancement information (e.g., regarding how much an image or video has been changed) may be desired.

SUMMARY

The present disclosure describes systems and methods for image enhancement. Embodiments of the present disclosure provide an image enhancement system with a feedback mechanism that provides quantifiable image enhancement information. For example, a user may provide a media object (e.g., an image or video) that is processed by an image enhancement system. The image enhancement system may include a discriminator network that determines the quality of the media object. In cases where the discriminator network determines that the media object has a low image quality score (e.g., an image quality score below a quality threshold), the image enhancement system may perform enhancement on the media object using an enhancement network (e.g., using an enhancement network that includes a generative neural network or a generative adversarial network (GAN) model). The discriminator network may then generate an enhancement score for the enhanced media object that may be provided to the user as a feedback mechanism (e.g., where the enhancement score generated by the discriminator network quantifies the enhancement performed by the enhancement network).

A method, apparatus, non-transitory computer-readable medium, and system for media enhancement using discriminative and generative models with feedback are described. Embodiments of the method, apparatus, non-transitory computer-readable medium, and system are configured to receive a media object comprising an image or a video, determine that the media object has a low quality using a discriminator network, perform an enhancement on the media object using an enhancement network, wherein the enhancement network comprises a generative neural network; and generate an enhancement score using the discriminator network, wherein the enhancement score quantifies the enhancement performed by the enhancement network.

An apparatus, system, and method for media enhancement using discriminative and generative models with feedback are described. Embodiments of the apparatus, system, and method are configured to a discriminator network configured to generate a quality score for a media object, an enhancement network configured to enhance the media object; and a scoring component configured to generate an enhancement score based on an output of the enhancement network and output of the discriminator network.

A method, apparatus, non-transitory computer-readable medium, and system for media enhancement using discriminative and generative models with feedback are described. Embodiments of the method, apparatus, non-transitory computer-readable medium, and system are configured to identify a training set including a plurality of images and ground truth classification data indicating whether the images are high-quality images or low-quality images, select a number of training epochs for training a discriminator network, wherein the number of training epochs are selected such that a function representing the output of the discriminator network approaches a linear function over a majority of the training set; and, predict classification data for the training set for each of the training epochs based on the selected number; and update the discriminator network during each of the training epochs based on a comparison of the predicted classification data and the ground truth classification data.

DETAILED DESCRIPTION

Figure 1:
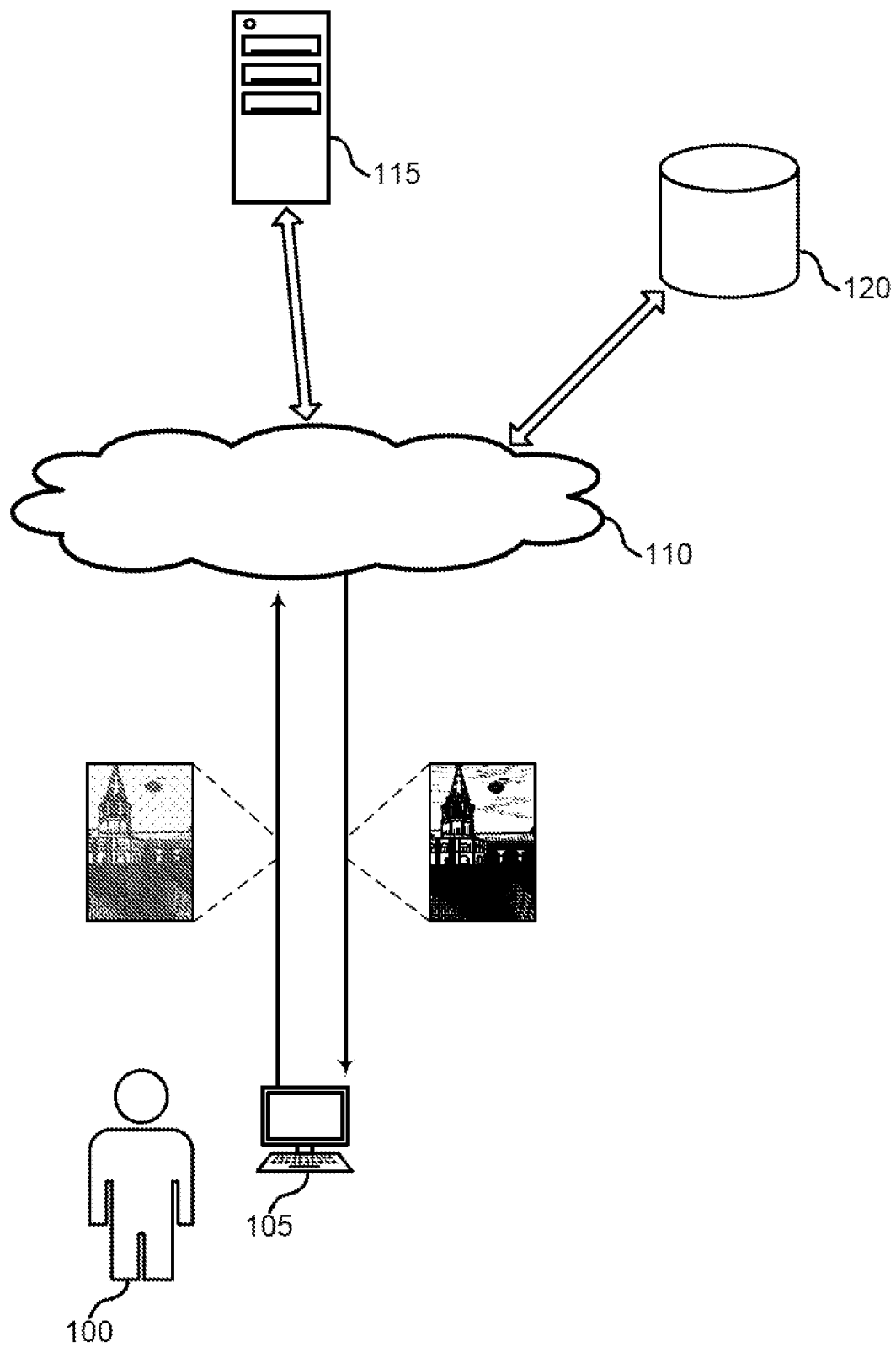
FIG. 1 shows an example of a system for image enhancement according to aspects of the present disclosure.

The present disclosure relates generally to image enhancement. More specifically, embodiments of the present disclosure provide a system where a generative model (e.g., an enhancement network) is used to modify or enhance a media object, and a discriminative model (e.g., a discriminator network) then provides feedback related to the enhancement. Such systems can provide user feedback including both visualization and quantification of the modifications made to the media object. As a result, users may enhance an image or video and receive instantaneous feedback on the amount of enhancement performed by the system.

Image enhancement is commonly used in image editing software. Some image editing software allows users to modify images manually by changing pixel data or adjusting global features such as exposure, brightness, etc. Although tedious and time-consuming, manual adjustments may also provide users feedback related to the amount of adjustment that has been performed. Therefore, in some cases, image editing applications use neural networks, such as a generative adversarial network (GAN), to perform advanced modifications where both local features and global features are adjusted. However, such systems do not quantify the enhancement or the increase in quality of the modified media objects (e.g., modified images, modified videos, etc.).

Embodiments of the present disclosure provide an improved image enhancement system that can enhance media objects automatically and provide users with feedback that includes quantified media object enhancement information (e.g., such as an enhancement score that quantifies the amount of modification or enhancement performed by the model, or a heat map indicating regions where enhancement was performed). In some examples, an image enhancement system includes a discriminator network that determines the quality of the media object in addition to an enhancement network that modifies the media object and generates feedback (e.g., in the form of an enhancement score that quantifies the enhancement performed by the enhancement network). In some embodiments, the discriminator network may determine an amount of enhancement that has been performed or will be performed by the enhancement network.

By applying the unconventional step of generating an enhancement score that quantifies enhancement performed by a neural network enhancement system, embodiments of the present disclosure provide instantaneous feedback on the amount of enhancement performed by the system. The enhancement may relate to global features, local features, or both. This feedback can be interpreted and analyzed by the user to categorize or provide further enhancement of images. As a result, embodiments of the present disclosure can reduce the number of user-submitted images that may be rejected by image software based on inferior quality.

The present disclosure provides a system where a user can see the amount of enhancement performed on regions of a media object in a quantitative manner. For instance, a discriminator can show the most defective areas in media objects, which can be highlighted by using CAM (Class Activated Maps). In cases where a media object includes an image, image enhancement can be performed on a single image. In cases where a media object includes a video, the video enhancement can be performed on each frame of the video (e.g., a video component may loop over frames of the video to apply the discriminator network and the enhancement network to the frames of the video). In some embodiments, for video enhancement, the enhancement scores of individual frames are aggregated (e.g., depending upon the sampling rate) to calculate the enhancement score for the video (e.g., to quantify the amount of enhancement performed on the video over the course of the various enhancements made to different frames).

Embodiments of the present disclosure may be used in the context of image enhancement. For example, a media object such as an image or video frame may be provided to an image enhancement system that provides quantified enhancement information based on the output of an enhancement network and a discriminator network. The discriminator network may determine a quality score and an amount of enhancement to be performed by the enhancement network. When it is determined that the media object is to be enhanced, the enhancement network enhances the media object. A scoring component then generates an enhancement score based on the output of the enhancement network and the discriminator network.

Figure 2:
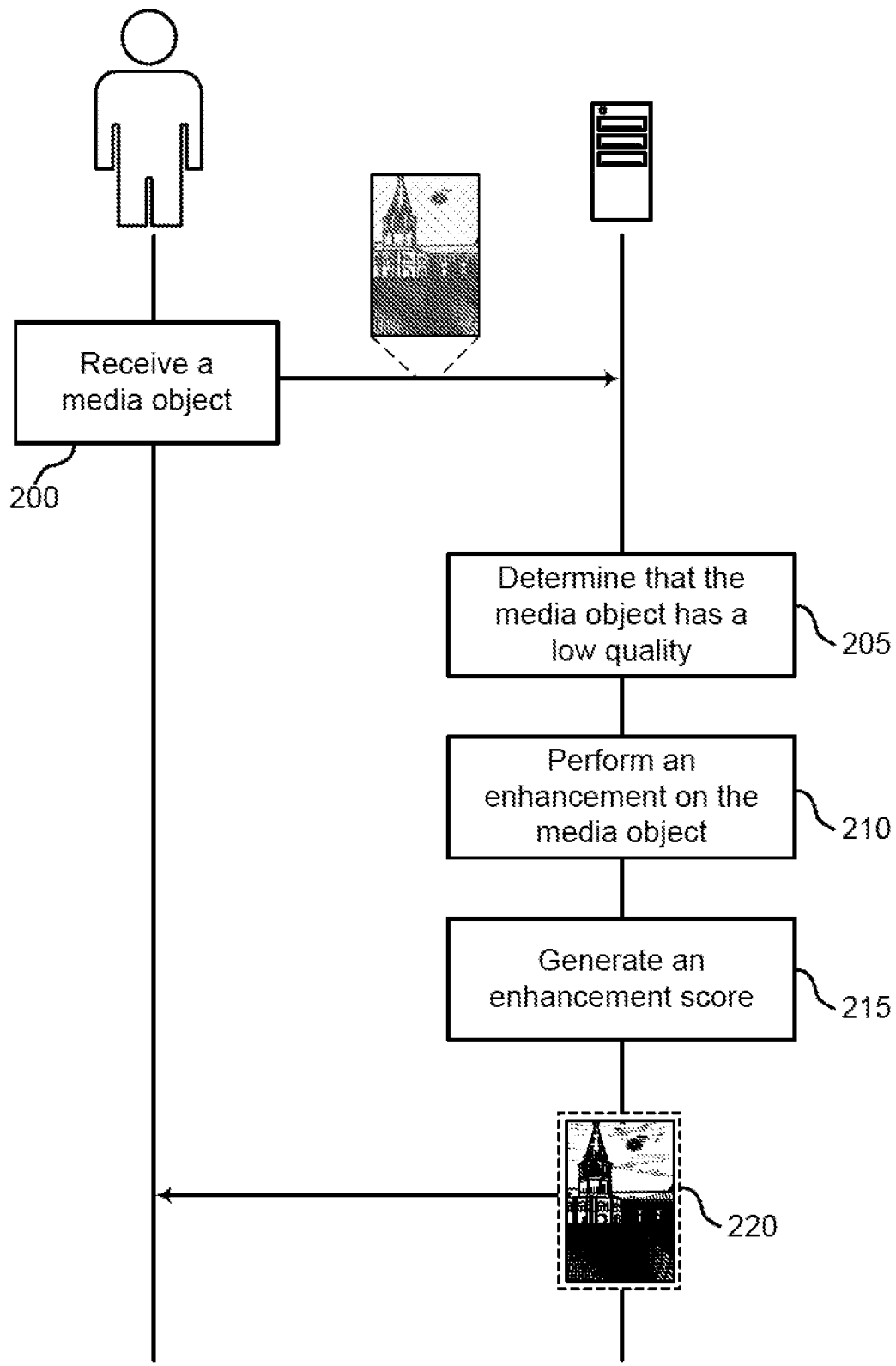
FIG. 2 shows an example of an image enhancement flowchart according to aspects of the present disclosure.
Figure 3:
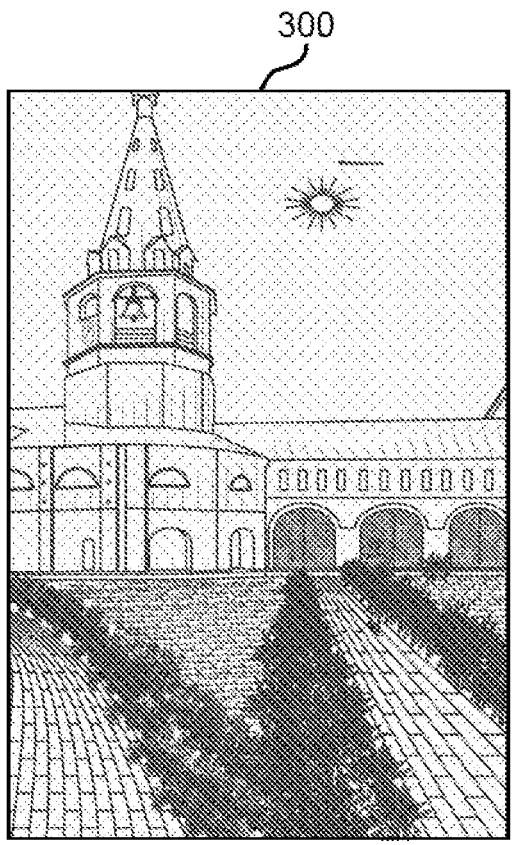
FIG. 3 shows an example of an image enhancement display according to aspects of the present disclosure.
Figure 3:
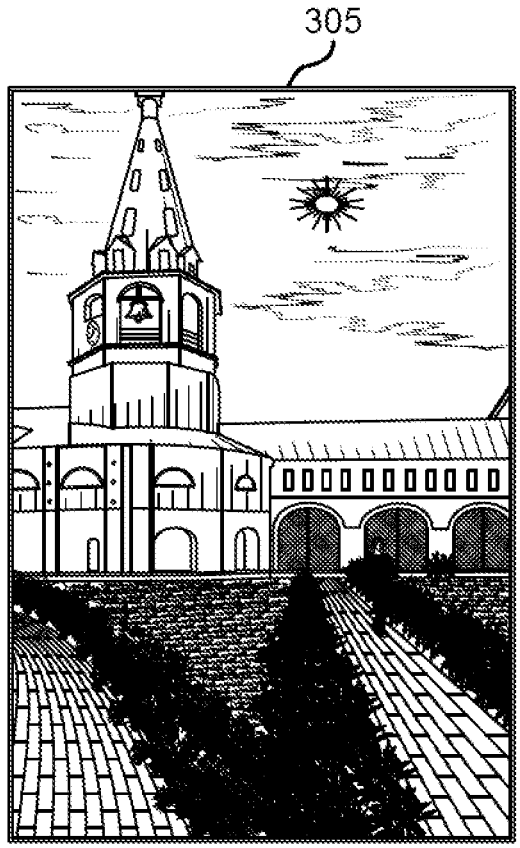

An example of an application of the inventive concept in the context of image enhancement is provided with reference to FIGS. 1-3. Details regarding the architecture of an example image enhancement system are provided with reference to FIGS. 4 and 5. Examples of processes for discriminative model and generative model-based media enhancement are provided with reference to FIGS. 6 and 7. A description of an example training process is described with reference to FIG. 8.

Image Enhancement Application

FIG. 1 shows an example of a system for image enhancement according to aspects of the present disclosure. The example shown includes user 100, device 105, cloud 110, enhancement system 115, and database 120. In the example of FIG. 1, enhancement is performed on an image. However, the techniques described herein generally apply to any media object modification. Moreover, image enhancement may refer to the enhancement of an image, or the enhancement of a video frame, or the enhancement of other media objects. Aspects of the disclosure described with reference to image enhancement may generally be applied to any modification of other media objects by analogy, without departing from the scope of the present disclosure.

The user 100 communicates with the enhancement system 115 via the user device 105 and the cloud 110. For example, the user 100 may provide a media object (e.g., such as an image or a video). In some examples, the media object provided by the user 100 may be referred to as an original or unmodified media object. In the example illustrated in FIG. 1, the media object includes an image representing a building. The user device 105 passes or transmits the media object the enhancement system 115 to modify or enhance the media object. In some examples, the user device 105 communicates with the enhancement system 115 via the cloud 110.

The user device 105 may be a personal computer, laptop computer, mainframe computer, palmtop computer, personal assistant, mobile device, or any other suitable processing apparatus. In some cases, the user device 105 includes software such as image editing software that has access to image editing tools that access cloud-based services. In other examples, the user device 105 includes the enhancement system 115.

Enhancement system 115 includes a discriminator network, an enhancement network, a scoring component, and a video component as described with reference to FIGS. 4, 5, and 7. In some examples, enhancement system 115 may be an example of the apparatus described with reference to FIG. 4.

The enhancement system 115 receives a media object comprising an image or a video, determines that the media object has a low quality using a discriminator network, performs an enhancement on the media object using an enhancement network, and generates an enhancement score using the discriminator network. Accordingly, as described herein, a visualization of the enhancement and the enhancement score (e.g., quantified enhancement information) are presented to the user 100. In some embodiments, the enhancement system 115 identifies an image, determines a quality score, determines if the quality score is above or below a threshold, and either accepts or rejects the image based on the quality score. In cases where the quality score satisfies a quality threshold, enhancement system 115 may add the media object to database 120. The process of using the enhancement system 115 to perform an image enhancement is further described with reference to FIG. 2.

In some cases, the enhancement system 115 is implemented as a cloud-based server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

A cloud 110 is a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud networks have functions distributed over multiple locations from central servers. A server is designated an edge server if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

According to some embodiments, database 120 stores the media object based on determining that the media object has a high quality. A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user 100 interacts with database controller. In other cases, database controller may operate automatically without user interaction. In some examples, the database 120 includes a set of media objects (e.g., image files). In some cases, a search is performed based and a search object (e.g., a media object) is retrieved from the database 120.

FIG. 2 shows an example of an image enhancement flowchart according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for media enhancement using discriminative and generative models with feedback is described. Embodiments of the method are configured to receive a media object comprising an image or a video, determine that the media object has a low quality using a discriminator network, and perform an enhancement on the media object using an enhancement network. In some embodiments, the enhancement network comprises a generative neural network (e.g., a GAN). Embodiments of the method are further configured to generate an enhancement score using the discriminator network, where the enhancement score quantifies the enhancement performed by the enhancement network.

At operation 200, the system receives a media object including an image or a video. According to an example, the media object may be of relatively low of high quality. Additionally, the image may be of any format such as JPEG, TIFF, RAW, BMP, HEIC, or the like. The video may be of any format such as Flash Video, WebM, MPEG, or the like.

At operation 205, the system determines that the media object has a low quality using a discriminator network. A discriminator network determines an amount of enhancement to be performed by an image enhancement system. The discriminator network may be a Resnet or ResNext based model. In another case of a video, depending upon the sampling rate, the score of individual frames are aggregated to calculate the score (i.e., the amount of enhancement) performed on the video.

At operation 210, the system performs an enhancement on the media object using an enhancement network, where the enhancement network includes a generative neural network. In some embodiments, the enhancement network is a dual GAN model. In some cases, the enhancement network enhances a single image, where the single image is either an image or a frame of a video file.

At operation 215, the system generates an enhancement score using the discriminator network (e.g., by providing a score between 0 and 1), where the enhancement score quantifies the enhancement performed by the enhancement network. In some examples, the number 0 corresponds to a good image and the number 1 corresponds to a bad image.

At operation 220, the system displays an enhanced image. The enhanced image may appear more visually pleasing to the user, or it may be more suitable for use in certain applications. In some examples, the system displays the enhancement score, which may provide quantified information regarding the modifications or enhancements made to the media object. Such feedback, including the amount of enhancement performed by the system, can be more efficiently interpreted and analyzed by the user.

An apparatus for media enhancement using discriminative and generative models with feedback is also described. The apparatus includes a processor, memory in electronic communication with the processor, and instructions stored in the memory. The instructions are operable to cause the processor to receive a media object comprising an image or a video, determine that the media object has a low quality using a discriminator network, perform an enhancement on the media object using an enhancement network, wherein the enhancement network comprises a generative neural network; and generate an enhancement score using the discriminator network, wherein the enhancement score quantifies the enhancement performed by the enhancement network.

A non-transitory computer-readable medium storing code for media enhancement using discriminative and generative models with feedback is also described. In some examples, the code comprises instructions executable by a processor to: receive a media object comprising an image or a video, determine that the media object has a low quality using a discriminator network, perform an enhancement on the media object using an enhancement network, wherein the enhancement network comprises a generative neural network; and generate an enhancement score using the discriminator network, wherein the enhancement score quantifies the enhancement performed by the enhancement network.

A system for media enhancement using discriminative and generative models with feedback is also described. Embodiments of the system are configured to receiving a media object comprising an image or a video, determining that the media object has a low quality using a discriminator network, performing an enhancement on the media object using an enhancement network, wherein the enhancement network comprises a generative neural network; and generating an enhancement score using the discriminator network, wherein the enhancement score quantifies the enhancement performed by the enhancement network.

Some examples of the method, apparatus, non-transitory computer-readable medium and system described above further include providing an upload interface to a user, wherein the media object is received via the upload interface. Some examples of the method, apparatus, non-transitory computer-readable medium, and system described above further include generating a first image quality score using the discriminator network. Some examples further include comparing the first image quality score to a quality threshold, wherein the determination that the media object has the low quality is based on the comparison. Some examples of the method, apparatus, non-transitory computer-readable medium, and system described above further include generating a second image quality score using the discriminator network following the enhancement. Some examples further include computing a difference between the first image quality score and the second image quality score, wherein the enhancement score is based on the difference. In some cases, a quality score may refer to a calculated or a generated numerical score that represents the quality of an image (e.g., that may be based on blur, pixelation, contrast, and various other parameters). An image enhancement score may refer to a calculated or a generated numerical score that represents an amount of enhancement that was performed (e.g., that may be based on a difference in blur, pixelation, contrast, and various other parameters between an original image and an enhanced image).

Some examples of the method, apparatus, non-transitory computer-readable medium, and system described above further include performing the enhancement on a plurality of frames of the media object, wherein the media object comprises the video. Some examples further include generating a frame score for each of the frames. Some examples further include computing an average of the frame scores for the frames, wherein the enhancement score is based on the average.

Some examples of the method, apparatus, non-transitory computer-readable medium, and system described above further include identifying a frame rate for the video. Some examples further include extracting the plurality of frames from the video based on the frame rate. Some examples of the method, apparatus, non-transitory computer-readable medium, and system described above further include determining that the media object has a high quality based at least in part on the enhancement score. Some examples further include storing the media object in a database based at least in part on the determining that the media object has the high quality.

Some examples of the method, apparatus, non-transitory computer-readable medium, and system described above further include identifying one or more regions of the media object where the enhancement was performed. Some examples further include displaying the one or more regions to a user. In some examples, the enhancement is performed on both local features and global features of the media object. In some examples, the discriminator network is trained using a reduced number of training epochs to achieve a sigmoid function with a relatively linear form.

FIG. 3 shows an example of an image enhancement display according to aspects of the present disclosure. The example shown includes original image 300 and enhanced image 305. The original image 300 and enhanced image 305 may contain local and/or global features.

As described herein, an image enhancement system receives a media object comprising an image or a video, determines that the media object has a low quality using a discriminator network, performs an enhancement on the media object using an enhancement network, and generates an enhancement score using the discriminator network. In the example of FIG. 3, an image enhancement system receives an original image 300 and performs an enhancement on the original image 300 using an enhancement network. Further, in addition to providing visualization of the enhancement (e.g., via displaying original image 300 and enhanced image 305), the image enhancement system provides feedback including the amount of enhancement performed by the system (e.g., the enhancement score) to the user.

In the example scenario of FIG. 3, original image 300 is determined to have an enhancement score of 0.98 and is rejected based on the enhancement score of greater than 0.9. Enhanced image 305 is determined to have an enhancement score of 0.22 and is accepted based on the enhancement score of less than 0.9. The example of FIG. 3 may use 0.9 as a quality threshold for accepting or rejecting an image (e.g., for determination of whether to add an enhanced image 305 to a database), but the present disclosure is not limited thereto and the threshold may be a different integer. As also described herein, the system of the present disclosure can reduce the number of user-submitted images that may be rejected by image software based on inferior quality, as the system described herein may improve image enhancement such that an increased number of enhanced images 305 may ultimately satisfy a quality threshold and be accepted by the image software.

Local features are the features corresponding to local areas in an image and are not found in every part of the image. For example, exposure and hue present in a sky of an image may contain local features. Global Features correspond to attributes that may be globally present in the image. As a result, every part of the image may have a particular attribute. Examples include out of the focus blur, noise in the image etc. As described herein, in some embodiments, one or more regions of a media object where the enhancement was performed (e.g., one or more regions of enhanced image 305) may be identified and displayed to a user.

Network Architecture

Figure 4:
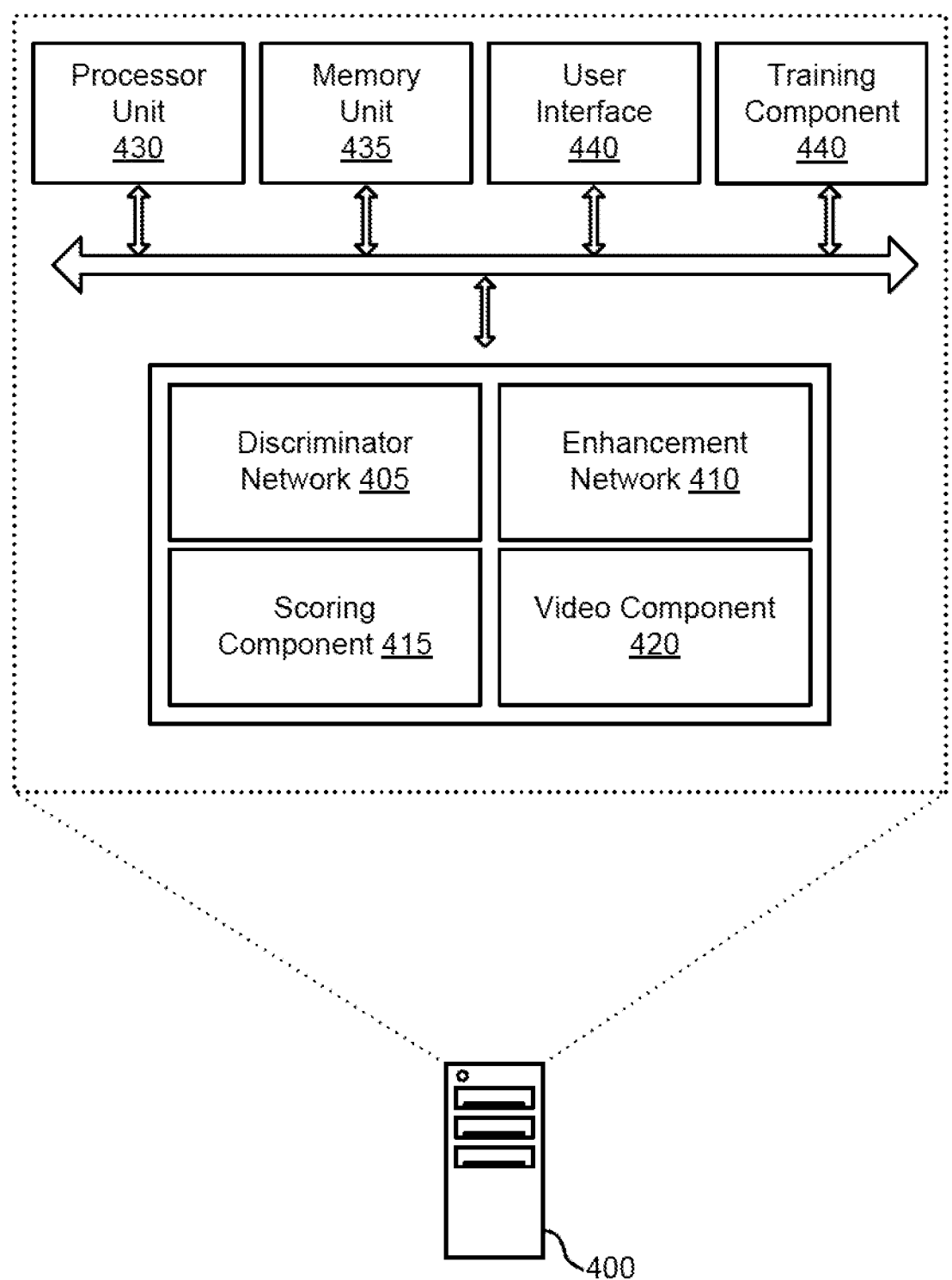
FIG. 4 shows an example of an image enhancement apparatus according to aspects of the present disclosure.

FIG. 4 shows an example of an image enhancement apparatus 400 according to aspects of the present disclosure.

In one embodiment, apparatus 400 includes discriminator network 405, enhancement network 410, scoring component 415, video component 420, user interface 425, processor unit 430, memory unit 435, training component 440, and media component 445.

An apparatus 400 for media enhancement using discriminative and generative models with feedback is described. Embodiments of the apparatus include a discriminator network 405 configured to generate a quality score for a media object, an enhancement network 410 configured to enhance the media object, and a scoring component 415 configured to generate an enhancement score based on the output of the enhancement network 410 and output of the discriminator network 405.

According to some embodiments, discriminator network 405 determines that the media object has a low quality. In some examples, discriminator network 405 generates an enhancement score using the discriminator network 405, where the enhancement score quantifies the enhancement performed by the enhancement network 410. In some examples, discriminator network 405 generates a first image quality score using the discriminator network 405. In some examples, discriminator network 405 compares the first image quality score to a quality threshold, where the determination that the media object has the low quality is based on the comparison. In some examples, discriminator network 405 generates a second image quality score using the discriminator network 405 following the enhancement. In some examples, discriminator network 405 computes a difference between the first image quality score and the second image quality score, where the enhancement score is based on the difference. In some examples, the discriminator network 405 is trained using a reduced number of training epochs to achieve a sigmoid function having a relatively linear form.

According to some embodiments, discriminator network 405 is configured to generate a quality score for a media object. In some examples, the discriminator network 405 includes a residual neural network. In some examples, the discriminator includes a quality detector and an exposure defect classifier. According to some embodiments, discriminator network 405 predicts classification data for the training set for each of the training epochs based on the selected number.

Discriminator network 405 is an example of, or includes aspects of, the corresponding element described with reference to FIG. 5. Accordingly, the discriminator network 405 may be a Resnet or ResNext based model. A discriminator network 405 determines an amount of enhancement to be performed (e.g., by an enhancement network 410 such as a dual GAN model). In another case of a video, depending upon the sampling rate, the score of individual frames are aggregated to calculate the score (i.e., the amount of enhancement) performed on the video.

According to some embodiments, enhancement network 410 is configured to enhance the media object. In some examples, the enhancement network 410 includes a generative adversarial network (GAN). The enhancement network 410 includes a computer-implemented network that generates an enhancement score corresponding to a quality of an image and determines if the image of acceptable quality.

According to some embodiments, enhancement network 410 performs an enhancement on the media object, where the enhancement network 410 includes a generative neural network. In some examples, enhancement network 410 performs the enhancement on a set of frames of the media object, where the media object includes the video. In some examples, enhancement network 410 identifies one or more regions of the media object where the enhancement was performed. In some examples, the enhancement is performed on both local features and global features of the media object.

Enhancement network 410 is an example of, or includes aspects of, the corresponding element described with reference to FIGS. 1, 5, and 7. In some embodiments, the enhancement network 410 is a dual GAN model and enhances a single image, where the single image is either an image or a frame of a video file.

According to some embodiments, scoring component 415 generates a frame score for each of the frames. In some examples, scoring component 415 computes an average of the frame scores for the frames, where the enhancement score is based on the average. In some examples, scoring component 415 determines that the media object has a high quality based on the enhancement score. Scoring component 415 is an example of, or includes aspects of, the corresponding element described with reference to FIG. 5.

According to some embodiments, scoring component 415 be configured to generate an enhancement score based on the output of the enhancement network 410 and the output of the discriminator network 405.

According to some embodiments, video component 420 identifies a frame rate for the video. In some examples, video component 420 extracts the set of frames from the video based on the frame rate. Video component 420 is an example of, or includes aspects of, the corresponding element described with reference to FIG. 5. According to some embodiments, video component 420 be configured to loop over frames of the video to apply the discriminator network 405 and the enhancement network 410 to the frames of the video.

According to some embodiments, user interface 425 receives a media object including an image or a video. In some examples, user interface 425 provides an upload interface to a user, where the media object is received via the upload interface. In some examples, user interface 425 displays the one or more regions to a user.

According to some embodiments, user interface 425 be configured to receive the media object. A user interface 425 may enable a user to interact with a device. In some embodiments, the user interface 425 may include an audio device, such as an external speaker system, an external display device such as a display screen, or an input device (e.g., remote control device interfaced with the user interface 425 directly or through an 10 controller module). In some cases, a user interface 425 may be a graphical user interface 425 (GUI).

A processor unit 430 is an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor unit 430 is configured to operate a memory array using a memory controller. In other cases, a memory controller is integrated into the processor unit 430. In some cases, the processor unit 430 is configured to execute computer-readable instructions stored in a memory to perform various functions. In some embodiments, a processor unit 430 includes special purpose components for modem processing, baseband processing, digital signal processing, or transmission processing.

Examples of a memory unit 435 include random access memory (RAM), read-only memory (ROM), or a hard disk. Examples of memory unit 435 include solid state memory and a hard disk drive. In some examples, memory unit 435 is used to store computer-readable, computer-executable software including instructions that, when executed, cause a processor to perform various functions described herein. In some cases, the memory unit 435 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within the memory unit 435 store information in the form of a logical state.

According to some embodiments, training component 440 identifies a training set including a set of images and ground truth classification data indicating whether the images are high-quality images or low-quality images. In some examples, training component 440 selects a number of training epochs for training a discriminator network 405, where the number of training epochs are selected such that a function representing the output of the discriminator network 405 approaches a linear function over a majority of the training set. In some examples, training component 440 updates the discriminator network 405 during each of the training epochs based on a comparison of the predicted classification data and the ground truth classification data. In some examples, training component 440 trains the discriminator using an initial number of epochs. In some examples, training component 440 determines that the output of the discriminator network 405 is not sufficiently linear. In some examples, training component 440 selects the number of training epochs to be less than the initial number of epochs based on the determination. In some examples, training component 440 uses the discriminator network 405 to generate an enhancement score for an image that has been enhanced by an enhancement network 410.

According to some embodiments, media component 445 be configured to determine whether the media object is a video. The media component 445 may contain programs or algorithms to sense whether an input media object is an image or a video. Media component 445 is an example of, or includes aspects of, the corresponding element described with reference to FIG. 5.

In some cases, the discriminator network 405 and/or the enhancement network 410 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

In some examples, the discriminator network 405 and/or the enhancement network 410 is an information retrieval system or a search system that performs media object modification (e.g., via content understanding). The discriminator network 405 and/or the enhancement network 410 can be used to identify objects, subjects, action, tone, emotion, concepts, aesthetics, style, and media types such as images, videos, documents, composites, etc. Based on information of the content, the discriminator network 405 and/or the enhancement network 410 can perform scoring operations, modifications, enhancements, etc., as described herein.

Generally, a neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

In some embodiments, the discriminator network 405 and/or the enhancement network 410 includes an artificial neural network. An artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

As described herein, a discriminative model (e.g., a discriminator network 405, a residual neural network, etc.) may include a neural network architecture that addresses issues associated with training deep neural networks. It operates by including identity shortcut connections that skip one or more layers of the network. In a generative model, stacking additional layers does not degrade performance or introduce training errors because skipping layers avoids the vanishing gradient problem of deep networks. In other words, the training gradient can follow "shortcuts" through the deep network. Weights are adjusted to "skip" a layer and amplify a previous skipped layer. In an example scenario, weights for an adjacent layer are adjusted and weights are not applied to an upstream layer.

As described herein, a generative model (e.g., enhancement network 410) may include or refer to a class of machine learning frameworks in which two neural networks contest each other (e.g., in a zero-sum game). For instance, a GAN is a category of ANN where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real).

In some examples, a training component is used to train the encoder of the retrieval network. A loss function is used during the training and the parameters of the encoder are iteratively updated based on the comparison. After training, the trained encoder is used to generate a sparse embedding for each of the media objects and a sparse query embedding for the query object. Training the encoder will be described in greater detail in FIG. 7.

Accordingly, a system for media enhancement using discriminative and generative models with feedback is described. The system comprises a discriminator network configured to generate a quality score for a media object, an enhancement network configured to enhance the media object; and a scoring component configured to generate an enhancement score based on the output of the enhancement network and output of the discriminator network.

A method of manufacturing an apparatus for media enhancement using discriminative and generative models with feedback is also described. The method includes manufacturing a discriminator network configured to generate a quality score for a media object, manufacturing an enhancement network configured to enhance the media object, and manufacturing a scoring component configured to generate an enhancement score based on output of the enhancement network and output of the discriminator network.

A method of using an apparatus for media enhancement using discriminative and generative models with feedback is also described. The method includes using a discriminator network configured to generate a quality score for a media object, using an enhancement network configured to enhance the media object, and using a scoring component configured to generate an enhancement score based on output of the enhancement network and output of the discriminator network.

Some examples of the apparatus, system, and method described above further include a user interface configured to receive the media object. Some examples of the apparatus, system, and method described above further include a database configured to store the media object. Some examples of the apparatus, system, and method described above further include a media component configured to determine whether the media object is a video. Some examples further include a video component configured to loop over frames of the video to apply the discriminator network and the enhancement network to the frames of the video. In some examples, the discriminator network comprises a residual neural network. In some examples, the discriminator comprises a quality detector and an exposure defect classifier. In some examples, the enhancement network comprises a GAN.

Figure 5:
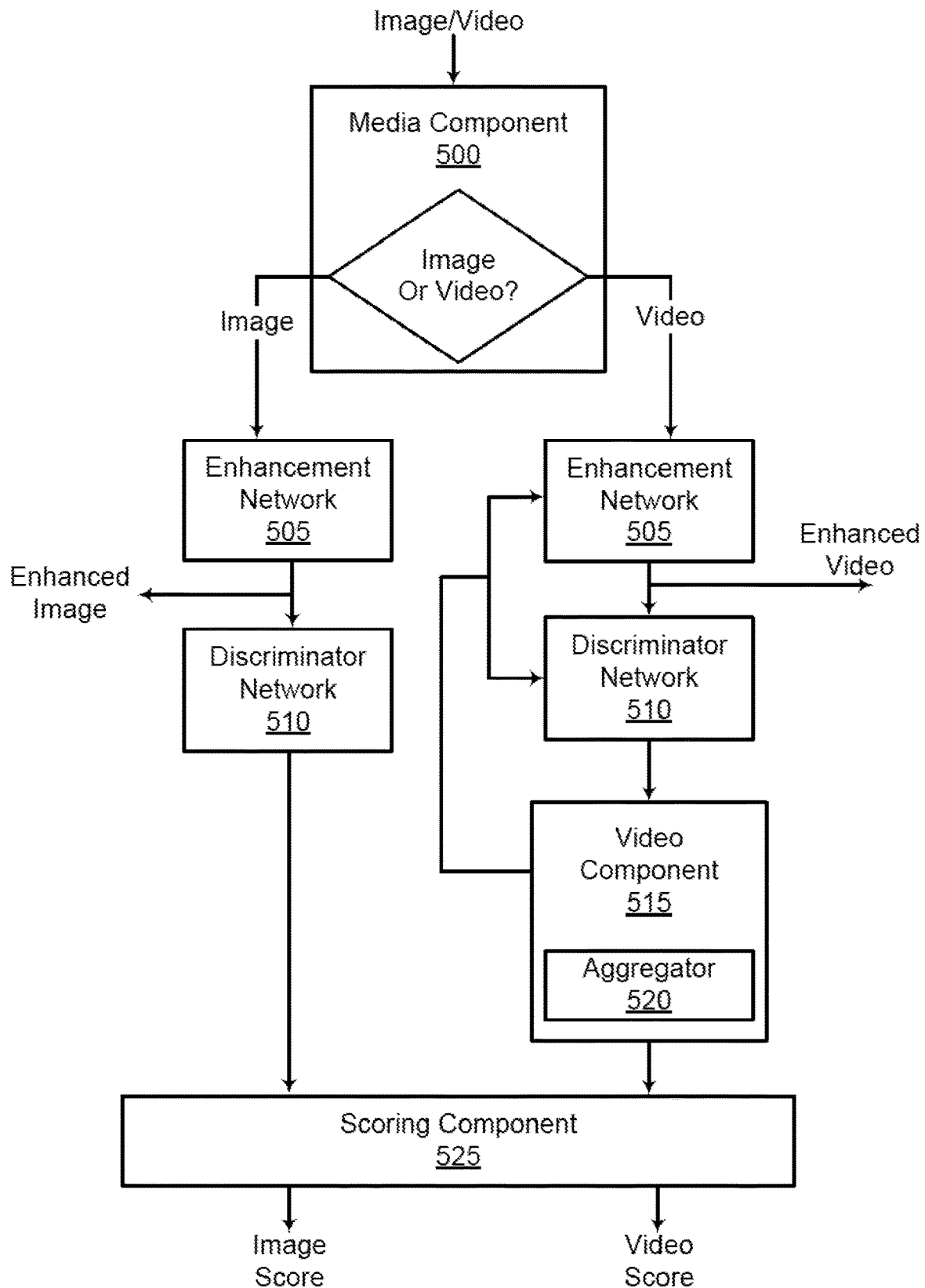
FIG. 5 shows an example of an image and video discriminator flowchart according to aspects of the present disclosure.

FIG. 5 shows an example of an image and video discriminator flowchart according to aspects of the present disclosure. The example shown includes media component 500, enhancement network 505, discriminator network 510, video component 515, and scoring component 525. Media component 500 is an example of, or includes aspects of, the corresponding element described with reference to FIG. 4. Enhancement network 505 is an example of, or includes aspects of, the corresponding element described with reference to FIGS. 1, 4, and 7. Discriminator network 510 is an example of, or includes aspects of, the corresponding element described with reference to FIG. 4.

In the example of FIG. 5, a media component 500 may determine whether a media object is an image or a video. The media object may then be passed to an enhancement network 505, where an enhanced media object may be generated. The enhanced media object may be passed to a discriminator network (e.g., which may generate a quality score for the media object before enhancement, after enhancement, etc.). Ultimately, a scoring component 525 may generate an enhancement score based on the modifications or enhancements made by the enhancement network 505. In examples where the media object is a video, a video component 515 may loop over frames of the video to apply the discriminator network 510 and the enhancement network 505 to the frames of the video (e.g., iteratively). In some examples, the video component 515 may include an aggregator 520. The enhancement scores of individual frames are aggregated (e.g., depending upon the sampling rate of the video) by the aggregator 520 to calculate the enhancement score for the video (e.g., to quantify the amount of enhancement performed on the video over the course of the various enhancements made to different frames by the enhancement network 510).

A discriminator network 510 is similar to a classifier that can provide a score for a class. In embodiments of the present disclosure, the two classes are the original image and the enhanced image. The discriminator network 510 of the GAN can be used for finding an amount of an enhancement. However, to make the change in score significant enough from the original image to the enhanced image, a new classifier (e.g., different from the discriminator network 510 of the GAN), is trained with a smaller number of epochs.

Video component 515 is an example of, or includes aspects of, the corresponding element described with reference to FIG. 4. In one embodiment, video component 515 includes aggregator 520. As described herein.

Scoring component 525 is an example of, or includes aspects of, the corresponding element described with reference to FIG. 4. Scoring component 525 may output one or both of an image score and a video score, providing a score between 0 and 1, where the enhancement score quantifies the enhancement performed by the enhancement network. The number 0 corresponds to a good image and the number 1 corresponds to a bad image.

Media Enhancement with Feedback

Figure 6:
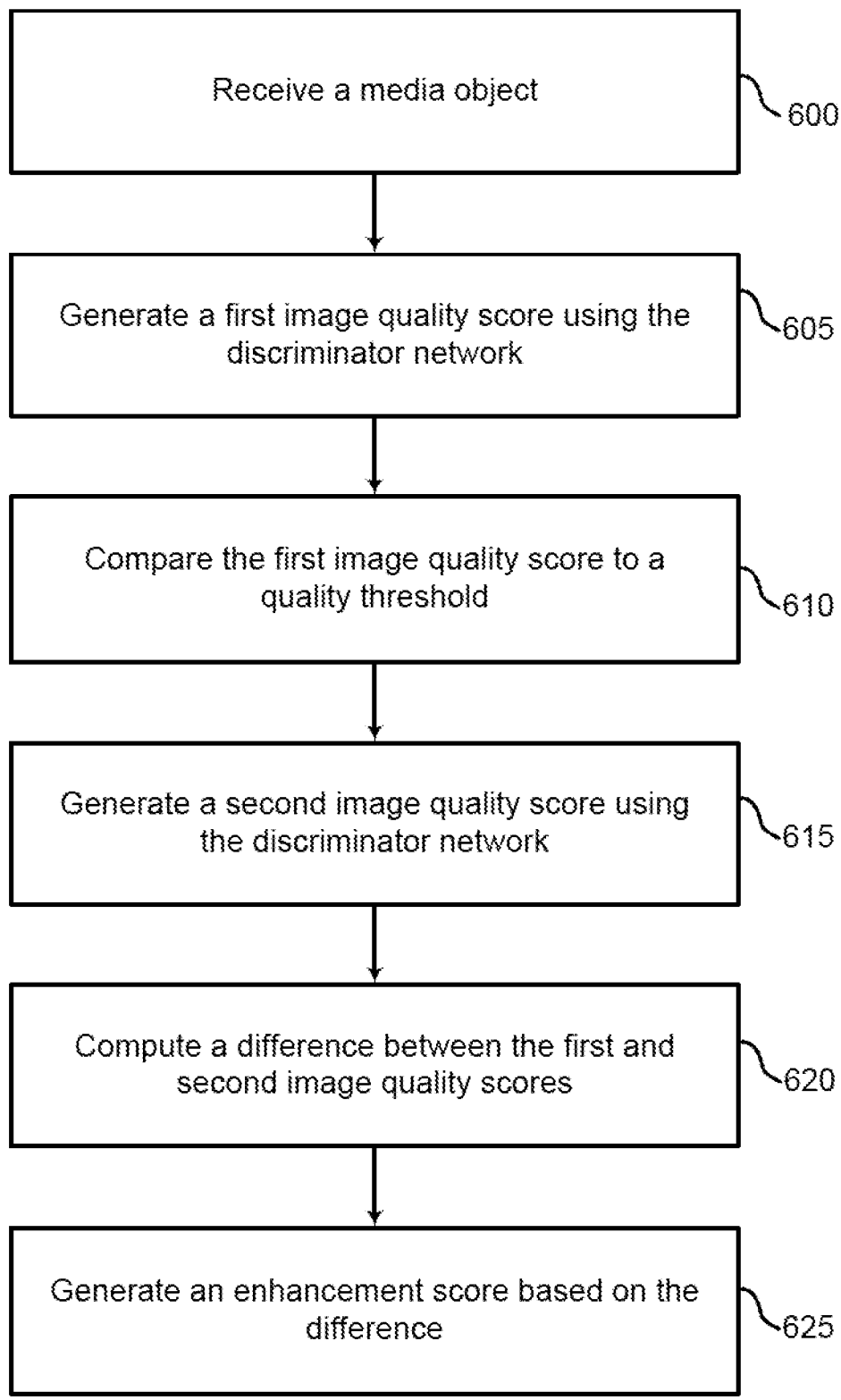
FIG. 6 shows an example of a process for image enhancement according to aspects of the present disclosure.

FIG. 6 shows an example of a process for image enhancement according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system receives a media object including an image or a video. In some cases, the operations of this step refer to, or may be performed by, a user interface as described with reference to FIG. 4. The media object may be an image, a video, or the like.

At operation 605, the system generates a first image quality score using the discriminator network. In some cases, the operations of this step refer to, or may be performed by, a discriminator network as described with reference to FIGS. 4 and 5.

At operation 610, the system compares the first image quality score to a quality threshold, where the determination that the media object has the low quality is based on the comparison. For example, a threshold may mean a score closer to 0 is of good quality, and a score closer to 1 is of bad quality. In some cases, the operations of this step refer to, or may be performed by, a discriminator network as described with reference to FIGS. 4 and 5.

At operation 615, the system generates a second image quality score using the discriminator network following the enhancement. In some cases, the operations of this step refer to, or may be performed by, a discriminator network as described with reference to FIGS. 4 and 5.

At operation 620, the system computes a difference between the first image quality score and the second image quality score, where the enhancement score is based on the difference. In some cases, the operations of this step refer to, or may be performed by, a discriminator network as described with reference to FIGS. 4 and 5.

At operation 625, the system generates an enhancement score using the discriminator network, where the enhancement score quantifies the enhancement performed by the enhancement network. The enhancement score provides instantaneous feedback about the amount of enhancement to the image. Therefore, image editing software with automatic enhancement features can show a user how much enhancement was performed on an image. In some cases, the operations of this step refer to, or may be performed by, a discriminator network as described with reference to FIGS. 4 and 5.

Figure 7:
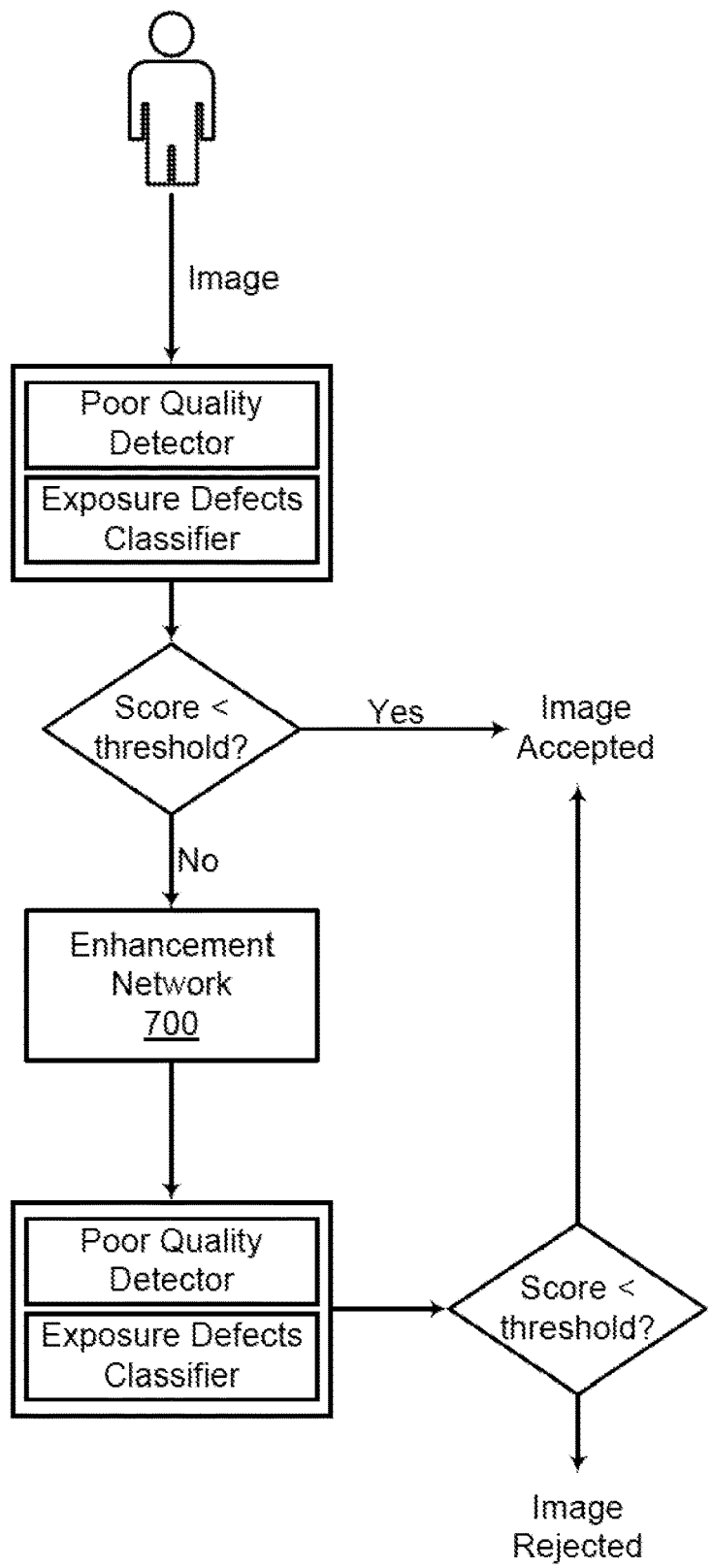
FIG. 7 shows an example of an image enhancement workflow according to aspects of the present disclosure.

FIG. 7 shows an example of an image enhancement workflow according to aspects of the present disclosure. FIG. 7 includes an enhancement network 700. Enhancement network 700 is an example of, or includes aspects of, the corresponding element described with reference to FIGS. 1, 4, and 5. In some embodiments, a user submits an image and, depending upon the quality of the image, the image is either accepted or rejected by the image editing software. If the images are rejected for low quality, the images may be enhanced, and the user can see a quantified amount of enhancement performed.

In an example scenario, if a first image is enhanced twice as well a second image, the change in score for the enhanced imaged is almost double. If the classifiers are trained with a greater number of epochs, a score beyond a certain point becomes saturated, and the sensitivity of the classifier is decreased.

A score closer to 0 means the image is good, whereas a score closer to 1 means the image is bad. Further, the larger the change in score, the larger is the enhancement done on the image.

Since a video consists of several frames instead of a single image, a similar technique is performed. If the video is relatively large, a sampling rate is determined, and the frames are extracted at the sampling rate. For example, the sampling rate may be 5 and the frames can be extracted a sampling rate of 5. A frame is passed through the enhancement model and the enhancement image is then passed through the discriminator.

The score for video enhancement may be calculated as in Equation 1.

$$\text{VideoEnhancementScore} = \Sigma(\text{frameScore} \ast \text{samplingRate})/\text{noOfFrames} \quad (1)$$

If the video is relatively small, some or all of the frames are used for enhancement. The enhanced frames are passed through the discriminator. The score is an average of the scores of the enhanced frames. The video enhancement score may be calculated using Equation 2.

$$\text{VideoEnhancementScore} = \Sigma(\text{frameScore})/\text{noOfFrames} \quad (2)$$

Training

Figure 8:
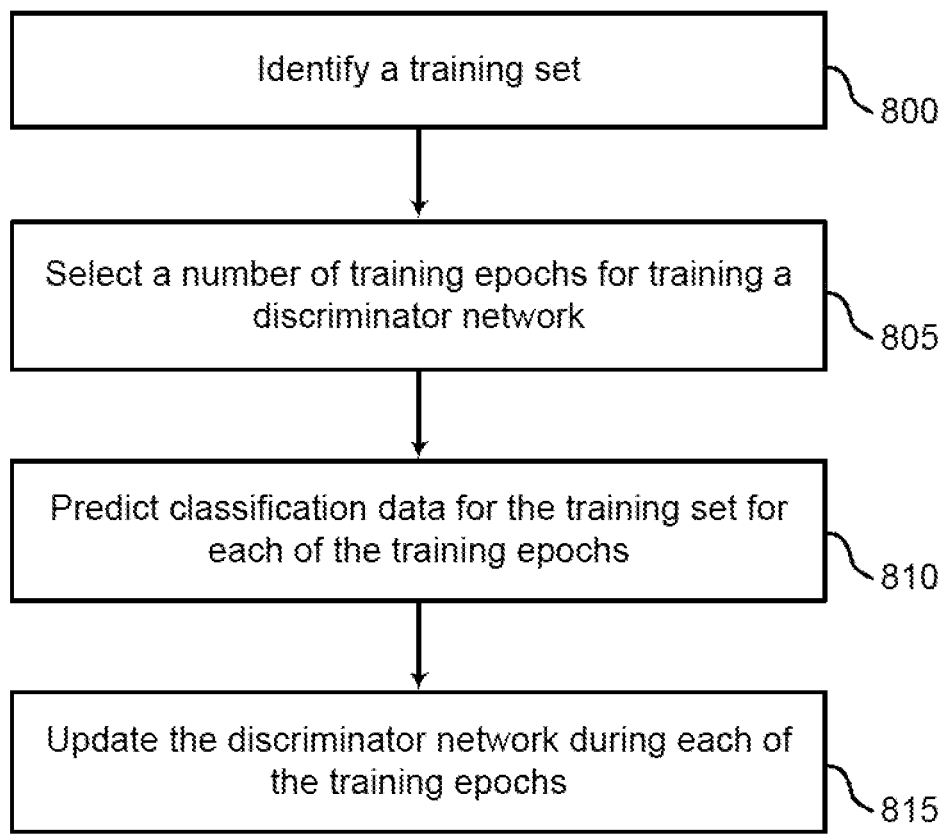
FIG. 8 shows an example of a process for media enhancement using discriminative and generative models with feedback according to aspects of the present disclosure.

FIG. 8 shows an example of a process for media enhancement using discriminative and generative models with feedback according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for media enhancement using discriminative and generative models with feedback is described. Embodiments of the method are configured to identify a training set including a plurality of images and ground truth classification data indicating whether the images are high-quality images or low-quality images. Embodiments of the method are further configured to select a number of training epochs for training a discriminator network, where the number of training epochs are selected such that a function representing the output of the discriminator network approaches a linear function over a majority of the training set. Embodiments of the method are further configured to predict classification data for the training set for each of the training epochs based on the selected number and update the discriminator network during each of the training epochs based on a comparison of the predicted classification data and the ground truth classification data.

At operation 800, the system identifies a training set including a set of images and ground truth classification data indicating whether the images are high-quality images or low-quality images. In some cases, the operations of this step refer to, or may be performed by, a training component as described with reference to FIG. 4.

At operation 805, the system selects a number of training epochs for training a discriminator network, where the number of training epochs are selected such that a function representing the output of the discriminator network approaches a linear function over a majority of the training set. In some cases, the operations of this step refer to, or may be performed by, a training component as described with reference to FIG. 4.

At operation 810, the system predicts classification data for the training set for each of the training epochs based on the selected number. In some cases, the operations of this step refer to, or may be performed by, a discriminator network as described with reference to FIGS. 4 and 5.

At operation 815, the system updates the discriminator network during each of the training epochs based on a comparison of the predicted classification data and the ground truth classification data. In some cases, the operations of this step refer to, or may be performed by, a training component as described with reference to FIG. 4.

In an example scenario for a method to determine the correct number of epochs, a number of images are uniformly sampled such that the images are a mix of defective images and enhanced images. The images are ranked in such a way that the most defective is provided a number and the most enhanced (i.e., good quality image) is provided another number. For example, in a scenario with 20 images, the most defective image may be ranked as number 1 and the most enhanced may be ranked as number 20. If the number of selected epochs is small, sensitivity is higher (e.g., as the output of the classifier may be somewhat linear).

A network is trained to be a classifier. In an example scenario, the classifier is trained for 5 epochs. Inference is performed on the images and scores are plotted to provide, for example, a sigmoid graph. In an example scenario, scores of S1 correspond to a first image, and scores of S2 correspond to a second image, and so on.

In an example scenario, a difference in scores of S2–S1 and S3–S2, and so on, are comparable. Therefore, S3–S1=2*(S2–S1) and S4–S1=3*(S2–S1) and so on. The scores are on a linear scale. If the scores are not on a linear scale, the process is repeated with one less epoch. In this case, reduce the number of epochs and repeat the same procedure. A reduction in the number of epochs continues to be reduced unless the scores are determined to be different.

An apparatus for media enhancement using discriminative and generative models with feedback is described. The apparatus includes a processor, memory in electronic communication with the processor, and instructions stored in the memory. The instructions are operable to cause the processor to identify a training set including a plurality of images and ground truth classification data indicating whether the images are high-quality images or low-quality images, select a number of training epochs for training a discriminator network, wherein the number of training epochs are selected such that a function representing the output of the discriminator network approaches a linear function over a majority of the training set; and, predict classification data for the training set for each of the training epochs based on the selected number; and update the discriminator network during each of the training epochs based on a comparison of the predicted classification data and the ground truth classification data.

A non-transitory computer-readable medium storing code for media enhancement using discriminative and generative models with feedback is described. In some examples, the code comprises instructions executable by a processor to: identify a training set including a plurality of images and ground truth classification data indicating whether the images are high-quality images or low-quality images, select a number of training epochs for training a discriminator network, wherein the number of training epochs are selected such that a function representing the output of the discriminator network approaches a linear function over a majority of the training set; and, predict classification data for the training set for each of the training epochs based on the selected number; and update the discriminator network during each of the training epochs based on a comparison of the predicted classification data and the ground truth classification data.

A system for media enhancement using discriminative and generative models with feedback is described. Embodiments of the system are configured to identifying a training set including a plurality of images and ground truth classification data indicating whether the images are high-quality images or low-quality images, selecting a number of training epochs for training a discriminator network, wherein the number of training epochs are selected such that a function representing the output of the discriminator network approaches a linear function over a majority of the training set; and, predicting classification data for the training set for each of the training epochs based on the selected number; and updating the discriminator network during each of the training epochs based on a comparison of the predicted classification data and the ground truth classification data.

Some examples of the method, apparatus, non-transitory computer-readable medium, and system described above further include training the discriminator using an initial number of epochs. Some examples further include determining that the output of the discriminator network is not sufficiently linear. Some examples further include selecting the number of training epochs to be less than the initial number of epochs based on the determination.

Some examples of the method, apparatus, non-transitory computer-readable medium, and system described above further include using the discriminator network to generate an enhancement score for an image that has been enhanced by an enhancement network.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein The described systems and methods may be implemented or performed by devices that include a general-purpose processor, a digital signal processor (DSP), an application-specific integrated circuit (ASIC), a field-programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
 receiving a media object comprising an image or a video;
 performing an enhancement on the media object using an enhancement network, wherein the enhancement network comprises a generative neural network of a generative adversarial network (GAN); and
 generating an enhancement score using a discriminator network of the GAN, wherein the enhancement score quantifies the enhancement performed by the enhancement network, and wherein the discriminator network is trained to produce an output based on a sigmoid activation function that approximates a linear function over a majority of a training set.

2. The method of claim 1, further comprising:
 providing an upload interface to a user, wherein the media object is received via the upload interface.

3. The method of claim 1, further comprising:
 generating a first image quality score using the discriminator network; and
 comparing the first image quality score to a quality threshold, wherein a determination that the media object has a low quality is based on the comparison.

4. The method of claim 3, further comprising:
 generating a second image quality score using the discriminator network following the enhancement; and
 computing a difference between the first image quality score and the second image quality score, wherein the enhancement score is based on the difference.

5. The method of claim 1, further comprising:
 performing the enhancement on a plurality of frames of the media object, wherein the media object comprises the video;
 generating a frame score for each of the plurality of frames; and
 computing an average of frame scores for the plurality of frames, wherein the enhancement score is based on the average.

6. The method of claim 1, further comprising:
 identifying a frame rate for the video; and
 extracting a plurality of frames from the video based on the frame rate.

7. The method of claim 1, further comprising:
 determining that the media object has a high quality based at least in part on the enhancement score; and
 storing the media object in a database based at least in part on the determining that the media object has the high quality.

8. The method of claim 1, further comprising:
 identifying one or more regions of the media object where the enhancement was performed; and
 displaying the one or more regions to a user.

9. The method of claim 1, wherein:
 the enhancement is performed on both local features and global features of the media object.

10. The method of claim 1, wherein:
 the discriminator network is trained using a reduced number of training epochs to achieve a sigmoid function having a relatively linear form.

11. An apparatus comprising:
 a discriminator network configured to generate a quality score for a media object;
 an enhancement network configured to enhance the media object, wherein the enhancement network comprises a generative neural network of a generative adversarial network (GAN); and
 a scoring component configured to generate an enhancement score based on output of the enhancement network and output of the discriminator network, wherein the discriminator network is trained using to produce an output based on a sigmoid activation function that approximates a linear function over a majority of a training set.

12. The apparatus of claim 11, further comprising:
 a user interface configured to receive the media object.

13. The apparatus of claim 11, further comprising:
 a database configured to store the media object.

14. The apparatus of claim 11, further comprising:
 a media component configured to determine whether the media object is a video; and
 a video component configured to loop over frames of the video to apply the discriminator network and the enhancement network to the frames of the video.

15. The apparatus of claim 11, wherein:
 the discriminator network comprises a residual neural network.

16. The apparatus of claim 11, wherein:
 the discriminator network comprises a quality detector and an exposure defect classifier.

17. A non-transitory computer readable medium storing code comprising instructions executable by a processor to:
 receive a media object comprising an image or a video;
 perform an enhancement on the media object using an enhancement network, wherein the enhancement network comprises a generative neural network of a generative adversarial network (GAN); and
 generate an enhancement score using a discriminator network of the GAN, wherein the enhancement score quantifies the enhancement performed by the enhancement network, and wherein the discriminator network is trained to produce an output based on a sigmoid activation function that approximates a linear function over a majority of a training set.

18. The non-transitory computer readable medium of claim 17, the code further comprising instructions executable by the processor to:

provide an upload interface to a user, wherein the media object is received via the upload interface.

19. The non-transitory computer readable medium of claim 17, the code further comprising instructions executable by the processor to:
generate a first image quality score using the discriminator network; and
compare the first image quality score to a quality threshold, wherein a determination that the media object has a low quality is based on the comparison.

* * * * *